US008943405B1

(12) United States Patent
Azose

(10) Patent No.: US 8,943,405 B1
(45) Date of Patent: Jan. 27, 2015

(54) ASSISTED PUNCTUATION OF CHARACTER STRINGS

(71) Applicant: Google Inc., Mountain View, CA (US)

(72) Inventor: Benjamin Albert Azose, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/092,475

(22) Filed: Nov. 27, 2013

(51) Int. Cl.
*G06F 17/00* (2006.01)
*G06F 17/21* (2006.01)

(52) U.S. Cl.
CPC ........................................ *G06F 17/21* (2013.01)
USPC ............ 715/259; 715/229; 715/260; 715/261

(58) Field of Classification Search
CPC G06F 17/2735; G06F 17/2288; G06F 17/276
USPC .......................................... 715/229, 259–261
See application file for complete search history.

(56) References Cited

U.S. PATENT DOCUMENTS

| 7,921,374 B2* | 4/2011 | Griffin ........................... 715/780 |
| 2006/0064652 A1* | 3/2006 | Ahokas .......................... 715/864 |
| 2008/0055269 A1* | 3/2008 | Lemay et al. ................. 345/173 |
| 2008/0270895 A1 | 10/2008 | Dam Nielsen et al. |
| 2009/0182741 A1* | 7/2009 | Chen et al. ........................ 707/6 |
| 2009/0192786 A1* | 7/2009 | Assadollahi ....................... 704/9 |
| 2010/0100371 A1* | 4/2010 | Yuezhong et al. ................ 704/9 |
| 2010/0283736 A1* | 11/2010 | Akabane et al. .............. 345/168 |
| 2013/0005400 A1 | 1/2013 | Hawkins et al. |
| 2013/0006615 A1* | 1/2013 | Scott ................................. 704/9 |
| 2013/0271381 A1* | 10/2013 | Lazaridis ...................... 345/171 |
| 2013/0275119 A1* | 10/2013 | Wei et al. .......................... 704/9 |

FOREIGN PATENT DOCUMENTS

| EP | 1256871 B1 | 1/1998 |
| EP | 1950646 A2 | 1/2008 |

\* cited by examiner

*Primary Examiner* — Chau Nguyen
(74) *Attorney, Agent, or Firm* — Shumaker & Sieffert, P.A.

(57) ABSTRACT

A computing device receives one or more indications of user input to enter a character string. In response, the computing device determines, based on a corpus that includes punctuated character strings previously entered by a user of the computing device, one or more punctuated versions of the character string. Each of the one or more punctuated versions of the character string includes one or more punctuation marks not present in the character string. The computing device outputs, for display, at least one of the one or more punctuated versions of the character string.

21 Claims, 10 Drawing Sheets

ASSISTED PUNCTUATION OF CHARACTER STRINGS

BACKGROUND

Some computing devices (e.g., mobile phones, tablet computers, etc.) may provide a graphical keyboard as part of a graphical user interface for composing text using a presence-sensitive display (e.g., a screen). The graphical keyboard may enable a user of the computing device to enter text (e.g., an e-mail, a text message, or a document, etc.). For instance, a presence-sensitive display of a computing device may output a graphical (or "soft") keyboard that enables the user to enter data by indicating (e.g., by tapping) keys displayed at the presence-sensitive display.

In some cases, a computing device may present a continuous-gesture graphical keyboard (sometimes referred to as a "combo gesture keyboard," or "gesture keyboard") with which a user can enter a character string by performing a continuous gesture that corresponds to the character string. For example, the computing device may determine that a user has entered a character string when the computing device receives an indication of a movement of an input object (i.e., an object used to provide input such as a finger or stylus) over regions of the presence-sensitive screen associated with keys for the letters of the character string. In this way, continuous-gesture graphical keyboards may allow a user to enter a character string or group of character strings with a single gesture. As such, a continuous-gesture graphical keyboard may allow the user to achieve a certain degree of input efficiency. Entry of text in this way may be referred to as "gesture typing."

As the user inputs text, the user may need to input punctuation marks, such as commas, periods, exclamation points, question marks, quotation marks, apostrophes, colons, and so on. Because the on-screen keyboards of many mobile devices are small, the on-screen keyboards may not have dedicated keys for each of the punctuation marks that a user may want to use when inputting text. Instead, when the user wants to input a punctuation mark, the user may instruct the mobile computing device to switch the displayed graphical keyboard from a graphical keyboard that has keys for letters to a graphical keyboard that has keys for punctuation marks (i.e., a punctuation-specific graphical keyboard). The user may then select the desired punctuation mark from the graphical keyboard that has keys for punctuation marks. Alternatively, in some examples, when the user wants to input a punctuation mark, the user may have to press and hold a key that doubles for a letter and a punctuation mark. Thus, in such examples, graphical keys may be repurposed for multiple meanings (e.g., lower case, upper case, numbers, punctuation, etc.).

SUMMARY

In one example, this disclosure describes a method comprising: receiving, by a computing device, one or more indications of user input to enter a character string; determining, by the computing device, based on a corpus that includes punctuated character strings previously entered by a user of the computing device, one or more punctuated versions of the character string, each of the one or more punctuated versions of the character string including one or more punctuation marks not present in the character string; and outputting, by the computing device and for display, the one or more punctuated versions of the character string.

In another example, this disclosure describes a computing device comprises one or more processors configured to receive one or more indications of user input to input a character string; determine, based on a corpus that includes punctuated character strings previously entered by a user of the computing device, one or more punctuated versions of the character string, each of the one or more punctuated versions of the character string including one or more punctuation marks not present in the character string; and output, for display, the one or more punctuated versions of the character string.

In another example, this disclosure describes a non-transitory computer-readable data storage medium having instructions stored thereon that, when executed, cause one or more processors of a computing device to: determine, in response to receiving one or more indications of user input to enter a character string, based on a corpus that includes punctuated character strings previously entered by a user of the computing device, one or more punctuated versions of the character string, each of the one or more punctuated versions of the character string including one or more punctuation marks not present in the character string; output, for display, the one or more punctuated versions of the character string; and responsive to receiving an indication of user selection of a particular character string from among the one or more punctuated versions of the character string, output, for display, the particular punctuated version of the character string in place of the character string.

One or more examples are set forth in the accompanying drawings and the description below. Other features, objects, and advantages will be apparent from the description, drawings, and claims.

DETAILED DESCRIPTION

In some implementations, a computing device may receive an indication of user input to enter a character string (e.g., one or more sentences). The computing device may then determine, based on a corpus that includes punctuated character strings previously entered by a user of the computing device, one or more punctuated versions of the character string. The punctuated versions of the character string may include one or more punctuation marks not present in the original character string. Different punctuated versions of the character string may include different sets of punctuation marks. The computing device may then receive an indication of user input to select one of the punctuated versions of the character string. In response to receiving the indication of the user input to select one of the punctuated versions of the character string, the computing device may perform some action with regard to the selected punctuated version of the character string. For example, the computing device may output the selected punctuated version of the character string in place of the character string. In another example, the computing device may send the selected punctuated version of the character string to another computing device. In this way, there may be no need for the user to select keys corresponding to the one or more punctuation marks in the selected punctuated version of the character string. The use of such techniques may improve text input speed.

Figure 1:
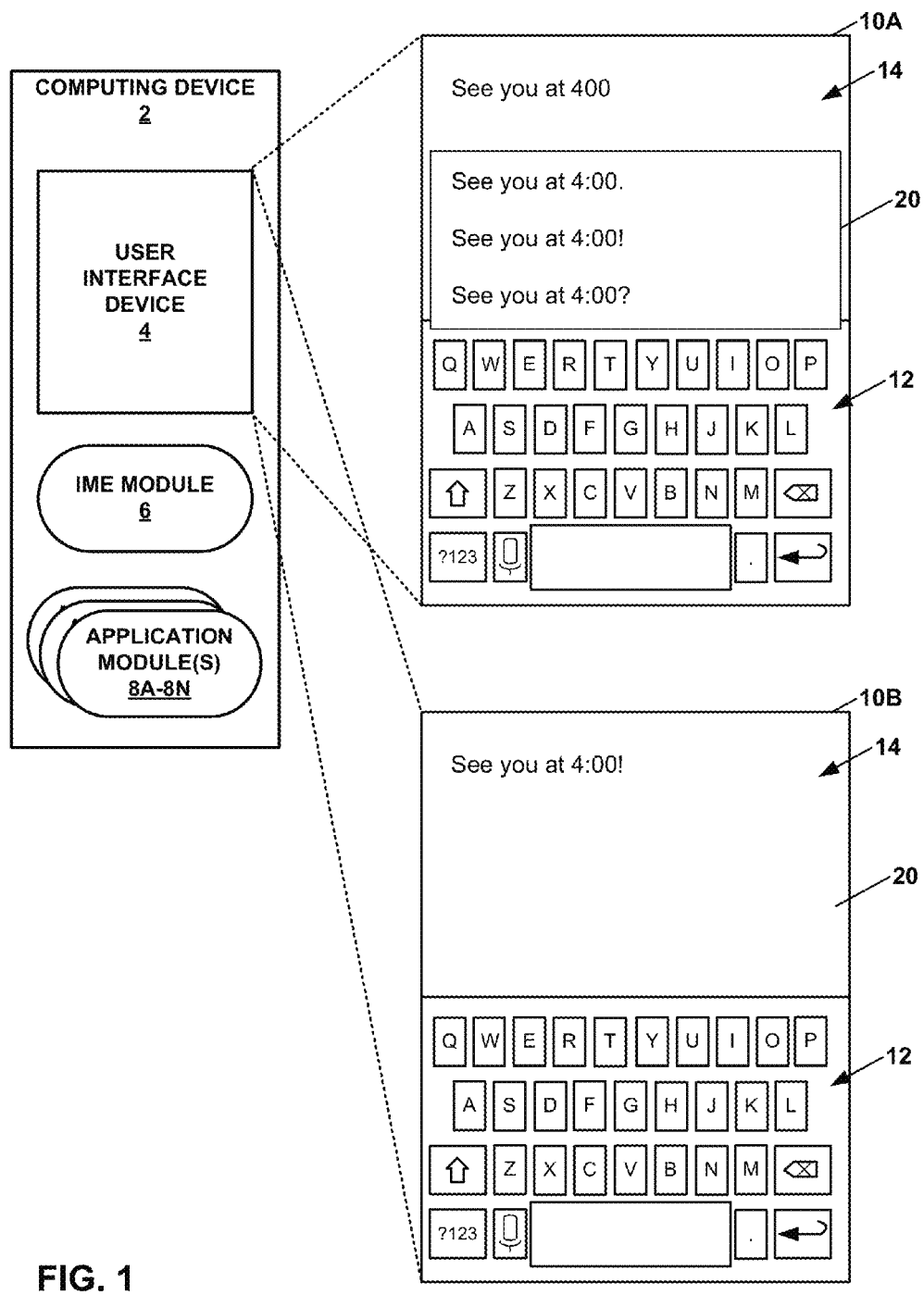
FIG. 1 is a conceptual diagram illustrating an example computing device, in accordance with one or more aspects of the present disclosure.

FIG. 1 is a conceptual diagram illustrating an example computing device 2 in accordance with one or more techniques of this disclosure. Computing device 2 may be various types of computing devices. For example, computing device 2 may be a mobile device, such as a mobile telephone, a tablet computer, a notebook or laptop computer, a personal media player, a portable gaming device, or another type of computing device designed for mobility. In other examples, computing device 2 may be other types of computing devices, such as desktop computers, point of sale devices, televisions, gambling devices, appliances, in-car computers, and other types of devices. Furthermore, in some examples, the term "computing device" may refer to a set of one or more integrated circuits, such as microprocessors, chipsets, and so on.

In the example of FIG. 1, computing device 2 includes at least one user interface (UI) device 4. UI device 4 may comprise a display device that displays graphical data and may also comprise a presence-sensitive input device that detects the presence of one or more input objects, such as fingers or styli. Because UI device 4 may display graphical data and may detect the presence of one or more input objects, UI device 4 may be referred to as a presence-sensitive display device. UI device 4 may be implemented using various technologies. For example, UI device 4 may be implemented using a resistive touchscreen, a surface acoustic wave touchscreen, a capacitive touchscreen, a projective capacitance touchscreen, an acoustic pulse recognition touchscreen, or another touchscreen technology. In some examples, UI device 4 may be able to detect the presence of an input object without the input object physically touching UI device 4. For example, in some such examples, UI device 4 may be able to detect the presence of the input object when the input object is within a particular space.

UI device 4 may be operatively coupled to computing device 2 in various ways. For example, UI device 4 may be integrated into a housing of computing device 2 and may be connected to computing device 2 via one or more internal connectors. In another example, UI device 4 may be external to a housing of computing device 2 and may communicate with computing device 2 via one or more external cables and/or communication networks.

Although the example of FIG. 1 assumes that UI device 4 is a presence-sensitive display device, the techniques of this disclosure are not so limited. In other examples, UI device 4 may be a display device that does not detect the presence of input objects. In some such examples, another device (e.g., one or more cameras, motion sensors, and/or other types of sensors) may detect the presence of input objects.

As shown in FIG. 1, computing device 2 outputs graphical user interfaces (GUI) 10A and 10B (collectively, GUI 10) for display at UI device 4. In general, a GUI may be a type of user interface that allows a user to use images to interact with a computing device. GUI 10 may include a graphical keyboard 12. Graphical keyboard 12 may include a set of graphical keys. At least some of the graphical keys are associated with one or more characters. In the example of FIG. 1, the graphical keys are arranged according to the QWERTY format. In other examples, the techniques of this disclosure may be implemented using a physical keyboard instead of a graphical keyboard.

In addition, GUI 10 may include a text entry area 14. Computing device 2 may output text for display in text entry area 14 in response to receiving indications of user input. In some examples, text entry area 14 may be a field or area where user-entered text appears.

Computing device 2 may include an input method editor (IME) module 6. IME module 6 may receive indications of user input (i.e., user input indications). The user input indications may comprise data that indicate user input received by computing device 2 and/or another device. IME module 6 may receive various types of user input indications. For example, IME module 6 may receive user input indications that indicate presses and releases of keys on a physical keyboard. In another example, IME module 6 may receive user input indications that indicate movements of one or more input objects. In this example, UI device 4 or another device may detect the movements of the one or more input objects. In another example, IME module 6 may receive user input indications that correspond to tapping gestures at various locations, such as graphical keys on graphical keyboard 12. In this example, the user input indications may correspond to tapping gestures at portions of a display device (e.g., UI device 4) that display graphical keys associated with characters.

In another example, IME module 6 may receive a user input indication that corresponds to a gesture termination event. In this example, the gesture termination event may occur when a presence-sensitive input device (such as UI device 4) is no longer able to detect the presence of an input object. In some examples, a presence-sensitive input device may be no longer able to detect the presence of an input object when a user lifts the input object off of the presence-sensitive input device. In other examples, IME module 6 may determine that a user input indication corresponds to a gesture termination event when the user input indication indicates the occurrence of a particular movement of one or more input objects.

IME module 6 may determine that particular user input indications correspond to strings of one or more characters (i.e., character strings). In various examples, IME module 6 may determine that particular user input indications correspond to character strings that match words in various languages, such as English, Russian, French, Japanese, Korean, Chinese, Hindi, Arabic, and so on.

In the example of FIG. 1, computing device 2 also includes application module(s) 8A-8N (collectively, "application module(s) 8"). Execution of instructions in application module(s) 8 may cause computing device 2 to provide various applications (e.g., "apps"). In some examples, IME module 6 may output the character strings determined by IME module 6 to one or more of application module(s) 8. Application module(s) 8 may process the character strings received from IME module 6. In some examples, an application module may output, in response to receiving a character string from IME module 6, the character string for display by a display device, such as UI device 4. However, in such examples, for ease of explanation, this disclosure may indicate that IME module 6 receives indications of user input and outputs graphical data for display.

Furthermore, when IME module 6 receives one or more user input indications, IME module 6 may determine whether the one or more user input indications correspond to a character string. For example, IME module 6 may receive indications that UI device 4 detected a series of tapping gestures at locations that correspond to graphical keys of graphical keyboard 12. In this example, IME module 6 may determine that the series of tapping gestures corresponds to a character string that comprises characters associated with the graphical keys at which UI device 4 detected the tapping gestures.

In another example, IME module 6 may receive an indication of a movement of an input object (e.g., a finger, stylus, etc.) along a spatial path. The spatial path may be a course along which the input object moves. During the movement of the input object along the spatial path, IME module 6 does not receive an indication of a gesture termination event. In some examples, the spatial path may be a substantially 2-dimensional path, e.g., a path along a substantially flat surface. For instance, the spatial path may be across a substantially flat surface of UI device 4 at which graphical keyboard 12 is displayed. In response to determining that one or more user input indications correspond to a movement of an input object along a spatial path, IME module 6 may determine, based at least in part on a group of one or more correspondences between locations of the plurality of graphical keys of graphical keyboard 12 and locations along the spatial path, a plurality of character strings. For instance, if locations along the spatial path correspond to locations of the graphical keys for the letters "t," "a," and "n," IME module 6 may determine that the word "tan" corresponds to the movement of the input object.

As the user inputs text, the user may need to input punctuation marks, such as commas, periods, exclamation points, question marks, quotation marks, apostrophes, colons, and so on. Because the graphical keyboards of computing device 2 may be small, graphical keyboard 12 may not have dedicated keys for each of the punctuation marks that a user may want to use when inputting text. Instead, when the user wants to input a punctuation mark, the user may instruct computing device 2 to switch the displayed graphical keyboard from a graphical keyboard that has keys for letters (e.g., graphical keyboard 12) to a graphical keyboard that has keys for punctuation marks (e.g., a punctuation-specific graphical keyboard). The user may then select the desired punctuation mark from the graphical keyboard that has keys for punctuation marks. Alternatively, in some examples, when the user wants to input a punctuation mark, the user may have to press and hold a key that doubles for a letter and a punctuation mark.

Inputting punctuation marks in this way may be disruptive to the user and may diminish the speed with which the user inputs text. Accordingly, the techniques of this disclosure may improve text input speed and may improve convenience for users by assisting users with insertion of punctuation marks in text.

For example, IME module 6 may receive an indication of a user input of a character string (e.g., one or more sentences). IME module 6 may then determine, based on a corpus, one or more punctuated versions of the character string. The corpus may include non-punctuated character strings and punctuated versions of the non-punctuated character strings. In other words, character strings in the corpus may be stored in two versions: with and without punctuation. In some examples, the strings in the corpus may include multi-word sentences (and hence the punctuated versions of the character string may each be multi-word sentences). Furthermore, in some examples, the corpus may include multi-sentence strings (e.g., paragraphs). The character strings (i.e., text) in the corpus may be similar in content and desired punctuation to character strings that the user of computing device 2 is likely enter in computing device 2. In some examples, the corpus may include punctuated character strings previously entered by a user of computing device 2. For instance, the corpus may include punctuated character strings entered by the user as part of the user's instant messaging history or text message (e.g., short message service (SMS)) history.

Thus, IME module 6 may determine, based on a corpus that includes punctuated character strings previously entered by a user of computing device 2, one or more punctuated versions of the character string. In some examples, the character string may match non-punctuated versions of the punctuated character strings previously-entered by the user. The non-punctuated versions of the punctuated character strings may be the same as the punctuated character strings except with punctuation marks removed. The punctuated versions of an inputted character string may include one or more punctuation marks not present in the inputted character string. Different punctuated versions of the character string may include different sets of punctuation marks. Furthermore, in some examples, the punctuated versions of the inputted character string may include one or more capitalized letters in place of non-capitalized letters in the inputted character string, or vice versa.

IME module 6 may then receive an indication of user input to select one of the punctuated versions of the character string. In response to receiving the indication of the user input to select a particular one of the punctuated versions of the character string, IME module 6 may output, for display, the particular punctuated version of the character string in place of the originally-entered character string. In this way, there may be no need for the user to select keys corresponding to the one or more punctuation marks in the particular punctuated version of the character string.

In different examples, IME module 6 may determine and output punctuated versions of an inputted character string in response to different events (i.e., character string completion events). In other words, in response to receiving an indication that the user has finished inputting the character string, IME module 6 may output, for display, the one or more punctuated versions of the character string. For example, IME module 6 may determine punctuated versions of an inputted character string in response to determining that the inputted character string is complete. For instance, in this example, IME module 6 may determine that an inputted character string is complete when IME module 6 receives an indication of a user input corresponding to a "." mark. In another instance, IME module 6 may determine that an inputted character string is complete when IME module 6 receives an indication of a user input to select a region of a user interface outside the graphical keyboard (e.g., graphical keyboard 12) and outside a text input box (e.g., text entry area 14) in which IME module 6 is outputting the character string. In another instance, IME module 6 may determine that an inputted character string is complete when IME module 6 receives an indication of a user selection of an enter key or a return key of the graphical keyboard (e.g., graphical keyboard 12). In another example, IME module 6 may determine that a character string completion event has occurred when IME module 6 receives an indication of a user input to send to another computing device a message (e.g., an SMS message, an instant message, an email message, etc.) that includes the character string.

In the example of FIG. 1, IME module 6 may receive an indication of a user input of the character string "See you at 400". IME module 6 may determine, based on the corpus that includes punctuated character strings previously entered by the user of computing device 2, a set of punctuated versions of the character string "See you at 400". This set of punctuated versions of the character string may include "See you at 4:00.", "See you at 4:00!", "See you at 4:00?", "See you at 400.", and so on. Furthermore, in this example, IME module 6 may receive an indication of user input to select the character string "See you at 4:00!". In this example, IME module 6 may, in response to receiving the indication of the user input to select the character string "See you at 4:00!", output, for display, this punctuated character string in place of "See you at 400", as shown in GUI 10B. In this way, there is no need for the user to select keys corresponding to the ":" or "!" punctuation marks.

In this way, computing device 2 may receive one or more indications of user input to input a character string. Furthermore, computing device 2 may determine, based on a corpus that includes punctuated character strings previously entered by a user of computing device 2, one or more punctuated versions of the character string. Each of the one or more punctuated versions of the character string may include one or more punctuation marks not present in the character string. Computing device 2 may then output, for display, the one or more punctuated versions of the character string.

Figure 2:
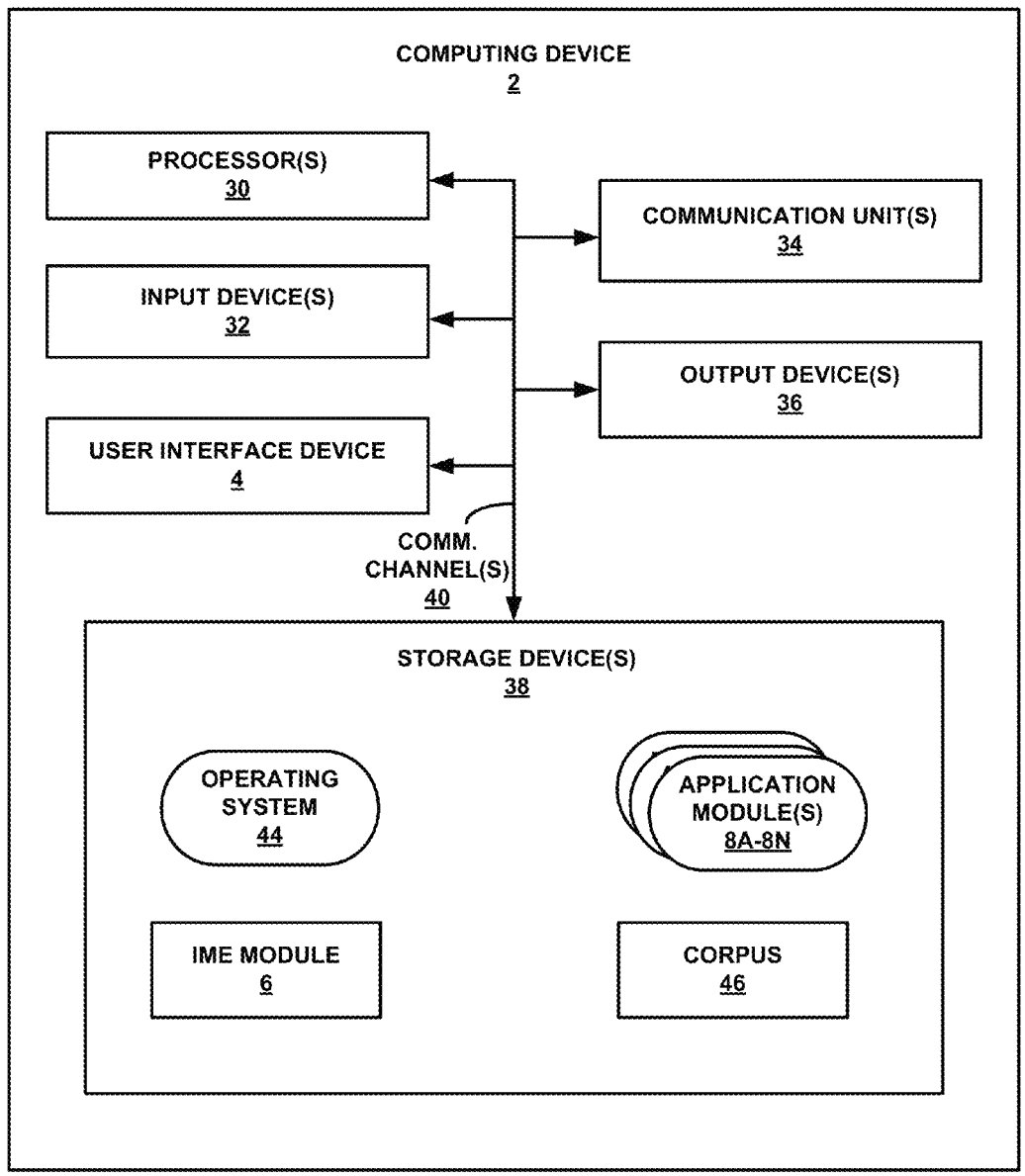
FIG. 2 is a block diagram illustrating an example computing device, in accordance with one or more aspects of the present disclosure.

FIG. 2 is a block diagram illustrating an example configuration of computing device 2, in accordance with one or more aspects of this disclosure. For purposes of illustration, the discussion of FIG. 2 and the following figures includes continued references to FIG. 1. However, the techniques of this disclosure are not so limited. FIG. 2 illustrates only one particular example of computing device 2, and many other example configurations of computing device 2 exist.

As shown in the example of FIG. 2, computing device 2 includes one or more processors 30, one or more input devices 32, one or more communication units 34, one or more output devices 36, one or more storage devices 38, one or more communication channels 40, and UI device 4. Computing device 2 may include many other components. For example, computing device 2 may include physical buttons, microphones, speakers, communication ports, and so on.

Communication channel(s) 40 may interconnect each of components 30, 32, 34, 36, 38, and 4 for inter-component communications (physically, communicatively, and/or operatively). In some examples, communication channel(s) 40 may include a system bus, a network connection, an inter-process communication data structure, or any other method for communicating data.

Storage device(s) 38 may store information required for use during operation of computing device 2. Storage device(s) 38, in some examples, have the primary purpose of being a short term and not a long-term computer-readable storage medium. Storage device(s) 38 may be volatile memory and may therefore not retain stored contents if powered off. Examples of volatile memories may include random access memories (RAM), dynamic random access memories (DRAM), static random access memories (SRAM), and other forms of volatile memories known in the art. Storage device(s) 38 may further be configured for long-term storage of information as non-volatile memory space and retain information after power on/off cycles. Examples of non-volatile memory configurations may include magnetic hard discs, optical discs, floppy discs, flash memories, or forms of electrically programmable memories (EPROM) or electrically erasable and programmable (EEPROM) memories. In some examples, processor(s) 30 on computing device 2 read and may execute instructions stored by storage device(s) 38.

Computing device 2 may include one or more input device(s) 32 that computing device 2 uses to receive user input. Examples of user input include tactile, audio, and video user input. Input device(s) 32 may include presence-sensitive screens, touch-sensitive screens, mice, keyboards, voice responsive systems, video cameras, microphones or other types of devices for detecting input from a human or machine.

Communication unit(s) 34 may enable computing device 2 to send data on and receive data from a communications network, such as a local area network or the Internet. In some examples, communication unit(s) 34 may include wireless transmitters and receivers that enable computing device 2 to communicate wirelessly with the communications network. Examples of communication unit(s) 34 may include network interface cards, Ethernet cards, optical transceivers, radio frequency transceivers, or other types of devices that are able to send and receive information. Other examples of such communication units may include Bluetooth, 3G, and WiFi radios, Universal Serial Bus (USB) interfaces, etc.

Output device(s) 36 may generate output. Examples of output include tactile, audio, and video output. Output device(s) 36 may include presence-sensitive screens, sound cards, video graphics adapter cards, speakers, cathode ray tube (CRT) monitors, liquid crystal displays (LCD), or other types of devices for generating output.

Processor(s) 30 may read instructions from storage device(s) 38 and may execute instructions stored by storage device(s) 38. Execution of the instructions by processor(s) 30 may configure or cause computing device 2 to provide at least some of the functionality ascribed in this disclosure to computing device 2. As shown in the example of FIG. 2, storage device(s) 38 include computer-readable instructions associated with operating system 44, IME module 6, and application modules 8A-8N. Execution of instructions associated with operating system 44 may cause computing device 2 to perform various functions to manage hardware resources of computing device 2 and to provide various common services for other computer programs. Execution of instructions associated with application modules 8 may cause computing device 2 to provide various applications (e.g., "apps," operating system applications, etc.).

Application modules 8 may provide particular applications, such as text messaging (e.g., SMS) applications, instant messaging applications, email applications, social media applications, text composition applications, and so on. Application modules 8 may invoke IME module 6 when application modules 8 need to provide a mechanism for enabling the user to input text. In some examples, application modules 8 may directly invoke IME module 6. In other examples, application modules 8 may invoke IME module 6 through one or more functions of operating system 44. In response to being invoked by an application, IME module 6 may output a graphical keyboard for display within or overlaid on a user interface of the application. IME module 6 may then receive indications of user input and determine character strings that correspond to the user input. IME module 6 may then provide the character strings to the application.

In the example of FIG. 2, the one or more storage devices 38 also store a corpus 46. In one example, corpus 46 stores punctuated versions of character strings (i.e., punctuated character strings). For instance, corpus 46 may store the following punctuated versions of the character string "See you soon": "See you soon!", "See you soon.", and "See you soon?". Furthermore, in this example, corpus 46 may store usage values for each punctuated version of a character string. The usage value for a punctuated character string may indicate how many times a user of computing device 2 has inputted or otherwise selected the punctuated character string. For example, corpus 46 store the following punctuated character strings: "See you soon!", "See you soon.", "See you soon?". In this example, corpus 46 may store a usage value of 21 for "See you soon!", a usage value of 45 for "See you soon.", and a usage value of 18 for "See you soon?". In this example, the usage value of 21 for "See you soon!" may indicate that the user has inputted or otherwise selected "See you soon!" 21 times, the usage value of 45 for "See you soon." may indicate that the user has inputted or otherwise selected "See you soon!" 45 times, and the usage value of 18 for "See you soon?" may indicate that the user has inputted or otherwise selected "See you soon!" eighteen times.

In some examples, corpus 46 includes punctuated and non-punctuated versions of character strings that the user of computing device 2 has previously entered. Furthermore, in such examples, corpus 46 may include usage values that indicate numbers of times that the user of computing device 2 has entered or otherwise selected punctuated versions of the character strings. The use of a corpus that includes punctuated and non-punctuated versions of character strings that the user of computing device 2 has previously entered and usage values based on numbers of times that the user of computing device 2 has entered or otherwise selected punctuated versions of the character strings may enable IME module 6 to adapt to formatting and punctuation idiosyncrasies of the user of computing device 2. In some examples, punctuated and non-punctuated versions of character strings and usage values may not necessarily all be based on input to computing device 2 by the user of computing device 2, but rather may be based at least in part on character strings input to other computing devices associated with the user by the user. For instance, if computing device 2 is a mobile phone and the user of computing device 2 also has a tablet computer, a usage value in corpus 46 for a particular punctuated character string may be incremented based on the tablet computer receiving an indication of user input to select or otherwise input the punctuated character string.

In other examples, corpus 46 may include other types of character strings. For instance, corpus 46 may include punctuated and non-punctuated versions of character strings that a population of other users has previously entered (e.g., all instant messages exchanged on an instant messaging service, all sentences in one or more books or web pages, etc.).

In accordance with one or more techniques of this disclosure, IME module 6 may receive indications of user input that correspond to a character string. IME module 6 may then identify punctuated versions of the character string. For example, if the character string is "See you soon", IME module 6 may identify the following punctuated character strings in corpus 46: "See you soon!", "See you soon.", and "See you soon?".

In addition, IME module 6 may rank the identified punctuated character strings according to the usage values stored in corpus 46 for the punctuated character strings. In other words, IME module 6 may determine, based on data regarding past usage by the user of one or more punctuated versions of the character string, a ranking order of the one or more punctuated versions of the character string. In some examples, the data regarding past usage by the user of the one or more punctuated versions of the character string may comprise data indicating numbers of times that computing device 2 has received indications of user input of the one or more punctuated versions of the character string.

Thus, in the example where corpus 46 stores a usage value of 21 for "See you soon!", a usage value of 45 for "See you soon.", and a usage value of 18 for "See you soon?", IME module 6 may rank "See you soon." highest, followed by "See you soon!", followed by "See you soon?". Identifying the punctuated character strings based on punctuated character strings previously entered by the user and ranking the identified punctuated character strings based on the usage values may effectively predict the desired punctuated character string because in many contexts (e.g., SMS messages, instant messages, etc.) computing device 2 is likely to receive variations of the same short character strings many times.

After determining the ranking order of the identified punctuated character strings, IME module 6 may output the punctuated character strings for display according to the determined ranking (i.e., the ranking order of the one or more punctuated versions of the character string). Thus, in the example above, IME module 6 may output the punctuated character strings in the order of "See you soon.", "See you soon!", and "See you soon?".

In at least some of the examples provided above, corpus 46 stores character strings that correspond to full sentences. Thus, in such examples, corpus 46 may store the punctuated character string "Are you going to school tomorrow?" and a separate punctuated character string "Are you going to work tomorrow?". Furthermore, in such examples, IME module 6 may determine whether corpus 46 includes punctuated versions of a character string that exactly matches the inputted character string. Thus, in such examples, IME module 6 does not use the punctuation pattern of one character string to determine possible punctuation patterns for similar sentences. For instance, in the example above, the character string "Are you going to school tomorrow?" is structurally similar to the character string "Are you going to work tomorrow?". In this example, if IME module 6 determines that user input corresponds to the character string "Are you going to school tomorrow", IME module 6 does not use information about the character string "Are you going to work tomorrow" when identifying and/or ranking punctuated versions of the character string "Are you going to school tomorrow".

In other examples, IME module 6 may use punctuated versions of character strings that do not exactly match an inputted character string to identify punctuated versions of the inputted character string. For example, IME module 6 may identify, in corpus 46, punctuated versions of a given character string whose first two words and last two words match the first two words and last two words of the inputted character string. In this example, IME module 6 may then transfer punctuation marks from the identified punctuated character strings to the inputted character string in order to generate punctuated versions of the inputted character string. IME module 6 may rank the punctuated versions of the inputted character string based on usage values for the identified punctuated character strings. In another example, IME module 6 may identify, based on punctuated versions of a character string that matches all but one word of an inputted character string, punctuated versions of the inputted character string.

Figure 3:
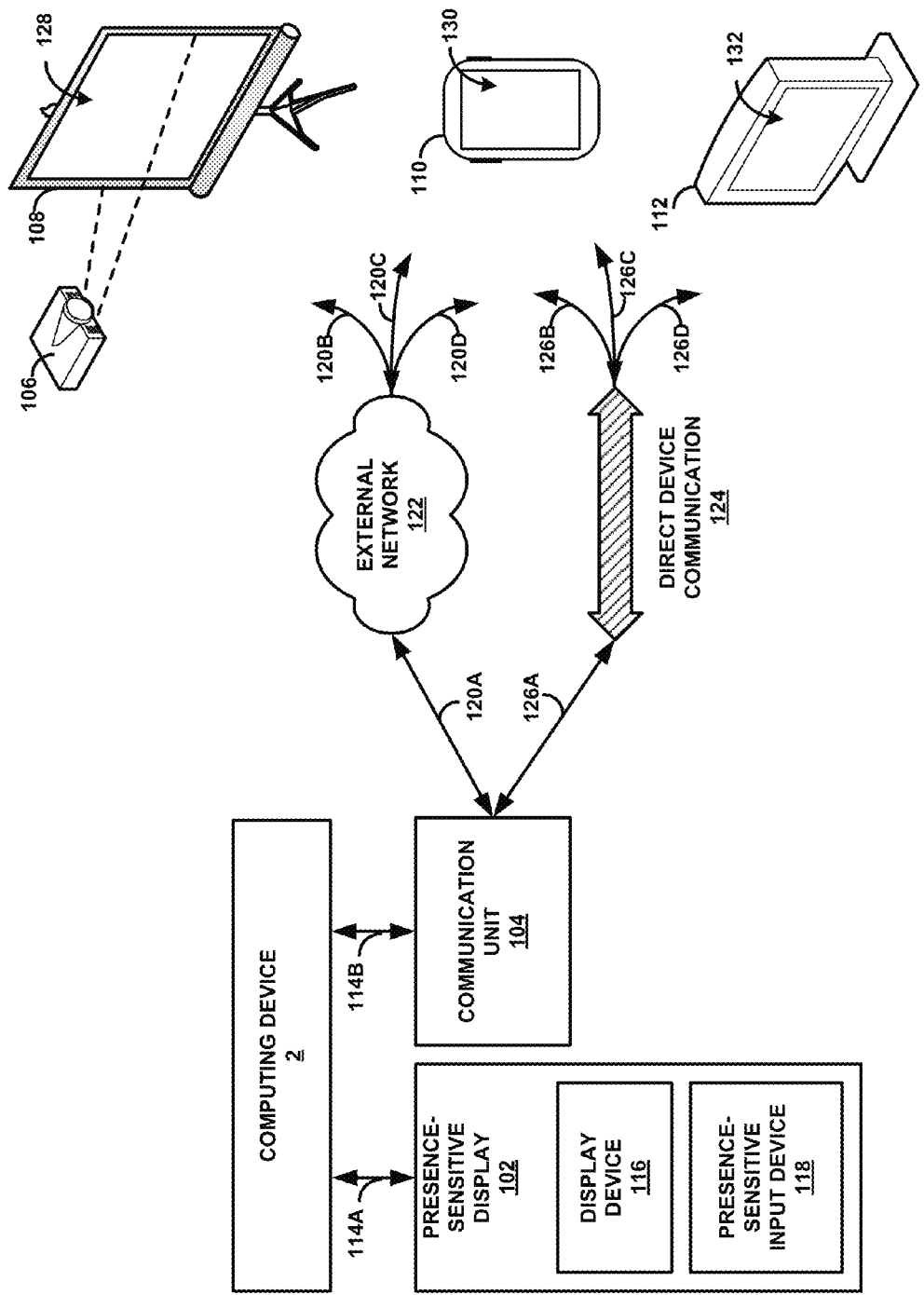
FIG. 3 is a block diagram illustrating an example in which a computing device outputs graphical content for display at one or more remote display devices, in accordance with one or more aspects of the present disclosure.

FIG. 3 is a block diagram illustrating an example computing device 2 that outputs data for display by one or more remote devices, in accordance with one or more techniques of the present disclosure. The one or more remote devices may display graphical content based on the data output by computing device 2. In general, graphical content may include any visual information that may be output for display, such as text, images, a group of moving images, etc. In some examples, computing device 2 may output data, such as Hypertext Markup Language (HTML) data, that a remote device may render to generate graphical content displayed by the remote device. In other examples, computing device 2 may output digital or analog signals that a remote device may use to generate graphical content displayed by the remote device.

In the example of FIG. 3, computing device 2 is operatively coupled to a presence-sensitive display 102 and a communication unit 104. Furthermore, in the example of FIG. 3, the one or more remote devices include a projector 106, a projection screen 108, a mobile device 110, and a visual display device 112. Computing device 2 may include and/or be operatively coupled to one or more other devices, e.g., input devices, output devices, memory, storage devices, etc. that are not shown in FIG. 3 for purposes of brevity and illustration.

Computing device 2 may be a processor that has the functionality described above with respect to processor(s) 30 (FIG. 2). For instance, computing device 2 may be a microprocessor, ASIC, or another type of integrated circuit configured to implement the techniques of this disclosure. In other examples, such as those illustrated in FIGS. 1 and 2, computing device 2 may be a stand-alone computing device that includes or is operatively coupled to a presence-sensitive display. In such examples, computing device 2 may be a desktop computer, a tablet computer, a smart television platform, a camera, a personal digital assistant (PDA), a server device, a mainframe computer, a telephone, a portable gaming device, a personal media player, a remote control device, a wearable computing device, or another type of computing device. In this disclosure, a first device may be said to be operatively coupled to a second device if the operations of the first and second devices are coupled in some way.

Computing device 2 may communicate with presence-sensitive display 102 via a communication channel 114A. Computing device 2 may communicate with communication unit 104 via a communication channel 114B. Communication channels 114A, 114B may each include a system bus or another suitable connection. Although the example of FIG. 3 shows computing device 2, presence-sensitive display 102, and communication unit 104 as being separate, computing device 2, presence-sensitive display 102, and/or communication unit 104 may be integrated into a single device.

In the example of FIG. 3, presence-sensitive display 102 includes a display device 116 and a presence-sensitive input device 118. Display device 116 may display graphical content based on data received from computing device 2. Presence-sensitive input device 118 may determine one or more user inputs (e.g., continuous gestures, multi-touch gestures, single-touch gestures, etc.). Presence-sensitive input device 118 may use capacitive, inductive, and/or optical recognition techniques to determine the user inputs. Presence-sensitive display 102 may send indications of such user inputs to computing device 2 via communication channel 114A or another communication channel. In some examples, presence-sensitive input device 118 is physically positioned relative to display device 116 such that presence-sensitive input device 118 is able to detect the presence of an input object (e.g., a finger or a stylus) at a location on display device 116 that displays a graphical element when a user positions the input object at the location on display device 116 that displays the graphical element.

Communication unit 104 may have the functionality of one or more of communication unit(s) 34. This disclosure describes the functionality of communication unit 34 with regard to FIG. 2. Examples of communication unit 104 may include network interface cards, Ethernet cards, optical transceivers, radio frequency transceivers, Bluetooth, 3G, and WiFi radios, Universal Serial Bus (USB) interfaces, or other types of devices that are able to send and receive data. When computing device 2 outputs data for display by the one or more remote devices (such as projector 106, projection screen 108, mobile device 110, and visual display device 112), computing device 2 may output the data to a communication unit of computing device 2, such as communication unit 104. Communication unit 104 may send the data to one or more of the remote devices. The one or more remote devices may display graphical content based at least in part on the data.

Communication unit 104 may send and receive data using various communication techniques. In the example of FIG. 3, a network link 120A operatively couples communication unit 104 to an external network 122. Network links 120B, 120C, and 120D may operatively couple each of the remote devices to external network 122. External network 122 may include network hubs, network switches, network routers, or other types of devices that exchange information between computing device 2 and the remote devices illustrated in FIG. 3. In some examples, network links 120A-120D may be Ethernet, ATM or other wired and/or wireless network connections.

In some examples, communication unit 104 may use direct device communication 124 to communicate with one or more of the remote devices included in FIG. 3. Direct device communication 124 may include communications through which computing device 2 sends and receives data directly with a remote device, using wired or wireless communication. That is, in some examples of direct device communication 124, data sent by computing device 2 may not be forwarded by one or more additional devices before being received at the remote device, and vice-versa. Examples of direct device communication 124 may include Bluetooth, Near-Field Communication, Universal Serial Bus, WiFi, infrared, etc. One or more of the remote devices illustrated in FIG. 3 may be operatively coupled with communication unit 104 by communication links 126A-126D. In some examples, communication links 126A-126D may be connections using Bluetooth, Near-Field Communication, Universal Serial Bus, infrared, etc. Such connections may be wireless and/or wired connections.

In the example of FIG. 3, projector 106 receives data from computing device 2. Projector 106 may project graphical content based on the data onto projection screen 108. The example of FIG. 3 shows projector 106 as a tabletop projector and shows projection screen 108 as a freestanding screen. In other examples, computing device 2 may output data for display by other types of projection devices, such as electronic whiteboards, holographic display devices, and other suitable devices for displaying graphical content.

In some examples, projector 106 may determine one or more user inputs (e.g., continuous gestures, multi-touch gestures, single-touch gestures, etc.) at projection screen 108 and send indications of such user input to computing device 2. In such examples, projector 106 may use optical recognition or other suitable techniques to determine the user input. Projection screen 108 (e.g., an electronic whiteboard) may display graphical content based on data received from computing device 2.

Mobile device 110 and visual display device 112 may each have computing and connectivity capabilities and may each receive data that computing device 2 output for display. Examples of mobile device 110 may include e-reader devices, convertible notebook devices, hybrid slate devices, etc. Examples of visual display device 112 may include televisions, computer monitors, etc. As shown in FIG. 3, projection screen 108 may include a presence-sensitive display 128, mobile device 110 may include a presence-sensitive display 130, and visual display device 112 may include a presence-sensitive display 132. Presence-sensitive displays 128, 130, 132 may have some or all of the functionality described in this disclosure for UI device 4. In some examples, presence-sensitive displays 128, 130, 132 may include functionality in addition to the functionality of UI device 4. Presence-sensitive displays 128, 130, 132 may receive data from computing device 2 and may display graphical content based on the data. In some examples, presence-sensitive displays 128, 130, 132 may determine one or more user inputs (e.g., continuous gestures, multi-touch gestures, single-touch gestures, etc.) and send indications of such user input to computing device 2. Presence-sensitive displays 128, 130, and/or 132 may use capacitive, inductive, optical recognition techniques and/or other techniques to determine the user input.

In some examples, computing device 2 does not output data for display by presence-sensitive display 102. In other examples, computing device 2 may output data for display such that both presence-sensitive display 102 and the one or more remote devices display the same graphical content. In such examples, each respective device may display the same graphical content substantially contemporaneously. In such examples, the respective devices may display the graphical content at different times due to communication latency. In other examples, computing device 2 may output data for display such that presence-sensitive display 102 and the one or more remote devices display different graphical content.

In the example of FIG. 3, computing device 2 may output, for display at display device 116, projector 106, mobile computing device 110, visual display device 112, etc., a graphical keyboard comprising a plurality of graphical keys. Furthermore, computing device 2 may receive indications of user input that corresponds to a character string. In some examples, the indications of user input may comprise indications of tapping gestures or sliding gestures at locations that correspond to particular graphical keys of the graphical keyboard. The character string may comprise one or more words.

In some examples, computing device 2 may determine one or more punctuated versions of the character string. The punctuated versions of the character string may include one or more punctuation marks not present in the character string. Furthermore, in some examples, the punctuated versions of the character strings may include one or more capitalized letters that were not capitalized in the character string. In some examples, the punctuated versions of the character strings may include one or more accented letters that were not accented in the original character string. Computing device 2 may determine a ranking order for the punctuated character strings and output, for display at display device 116, projector 106, mobile computing device 110, visual display device 112, etc., the punctuated character strings according to the ranking order.

Figure 4A:
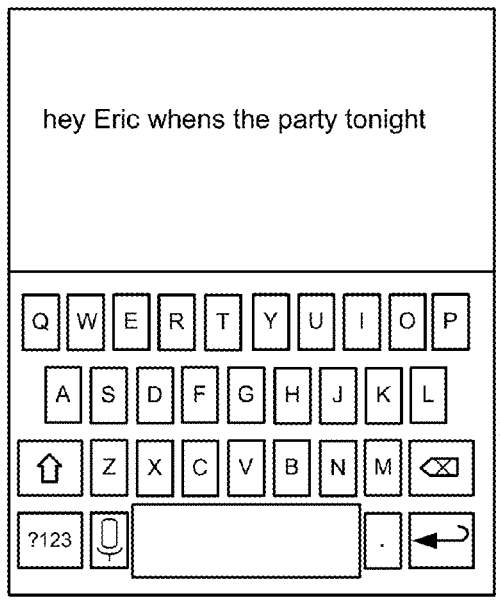
FIGS. 4A-4D are conceptual diagrams illustrating example configurations of a graphical user interface in which a computing device provides a user with an opportunity to use a punctuation-specific graphical keyboard to insert punctuation marks at automatically-determined candidate punctuation locations, in accordance with one or more techniques of this disclosure.

FIGS. 4A-4D are conceptual diagrams illustrating example configurations of GUI 10 in which computing device 2 provides a user with an opportunity to use a punctuation-specific graphical keyboard to insert punctuation marks at automatically-determined candidate punctuation locations, in accordance with one or more techniques of this disclosure. As illustrated in the example of FIG. 4A, computing device 2 may receive one or more indications of user input corresponding to the character string "hey Eric whens the party tonight".

Figure 4B:
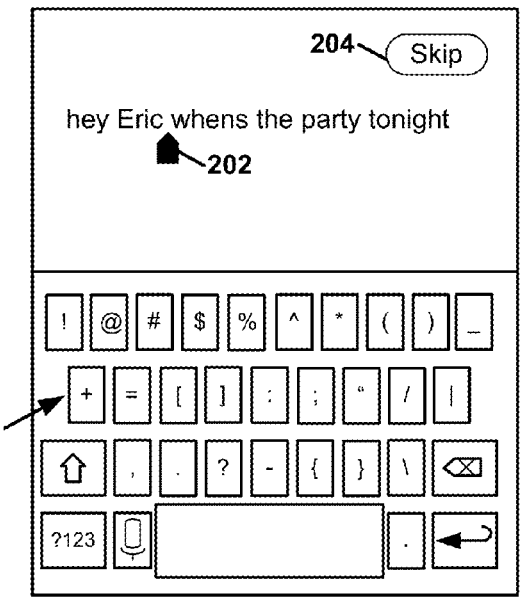

Subsequently, IME module 6 may identify one or more candidate punctuation locations in the character string. IME module 6 may identify the one or more candidate punctuation locations in accordance with any of the examples described elsewhere in this disclosure. If IME module 6 is able to identify one or more candidate punctuation locations in the character string, IME module 6 may output, for display, a punctuation-specific graphical keyboard 200. In addition, IME module 6 may output, for display, a current candidate punctuation location indicator 202 that indicates that a particular candidate punctuation location in the character string is the current candidate punctuation location. As illustrated in FIG. 4B, current candidate punctuation location indicator 202 indicates that a position following the word "Eric" is the current candidate punctuation location.

Figure 4C:
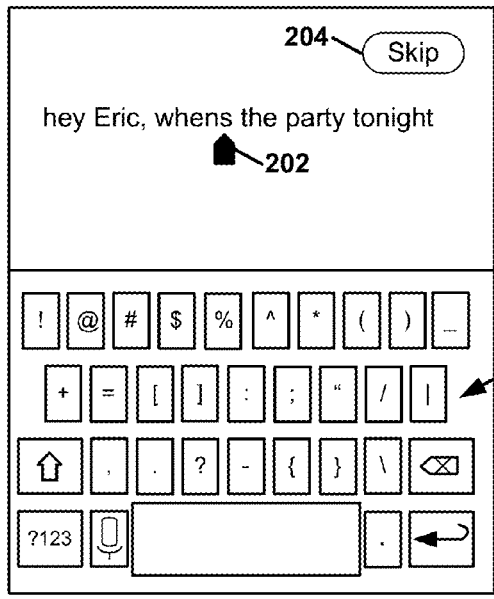

While the current candidate punctuation location indicator 202 indicates that a particular candidate punctuation location is the current candidate punctuation location, IME module 6 may receive an indication of user input that corresponds to a punctuation mark. In response, IME module 6 may output, for display, the punctuation mark at the current candidate punctuation location. As illustrated in the example of FIG. 4C, IME module 6 outputs the punctuation mark "," at the candidate punctuation location that follows the word "Eric". After receiving an indication that corresponds to a punctuation mark, IME module 6 may output current candidate punctuation location indicator 202 at a next candidate punctuation location. For instance, as illustrated in the example of FIG. 4C, IME module 6 may output current candidate punctuation location indicator 202 between "n" and "s" in the word "whens" after receiving an indication of user input of the punctuation mark ",".

Figure 4D:
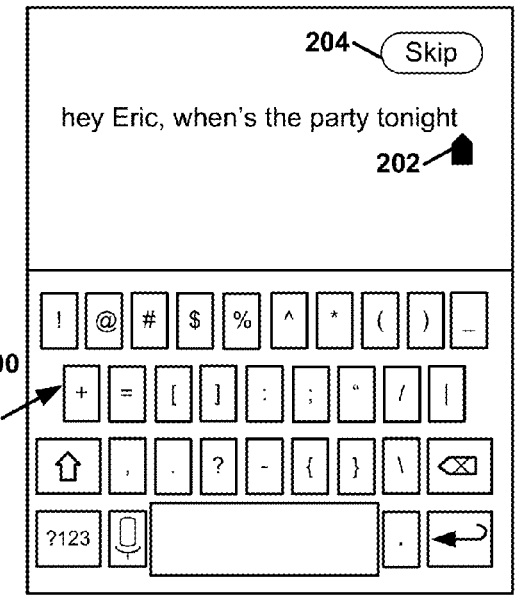

Furthermore, IME module 6 may output current candidate punctuation location indicator 202 such that, in response to receiving an indication of user input to skip the current candidate punctuation location, current candidate punctuation location indicator 202 indicates a next candidate punctuation location. In the examples of FIGS. 4B-4D, IME module 6 may output current candidate punctuation location indicator 202 such that current candidate punctuation location indicator 202 indicates the next candidate punctuation location in response to receiving an indication of a user selection of a "Skip" control 204.

Figure 5:
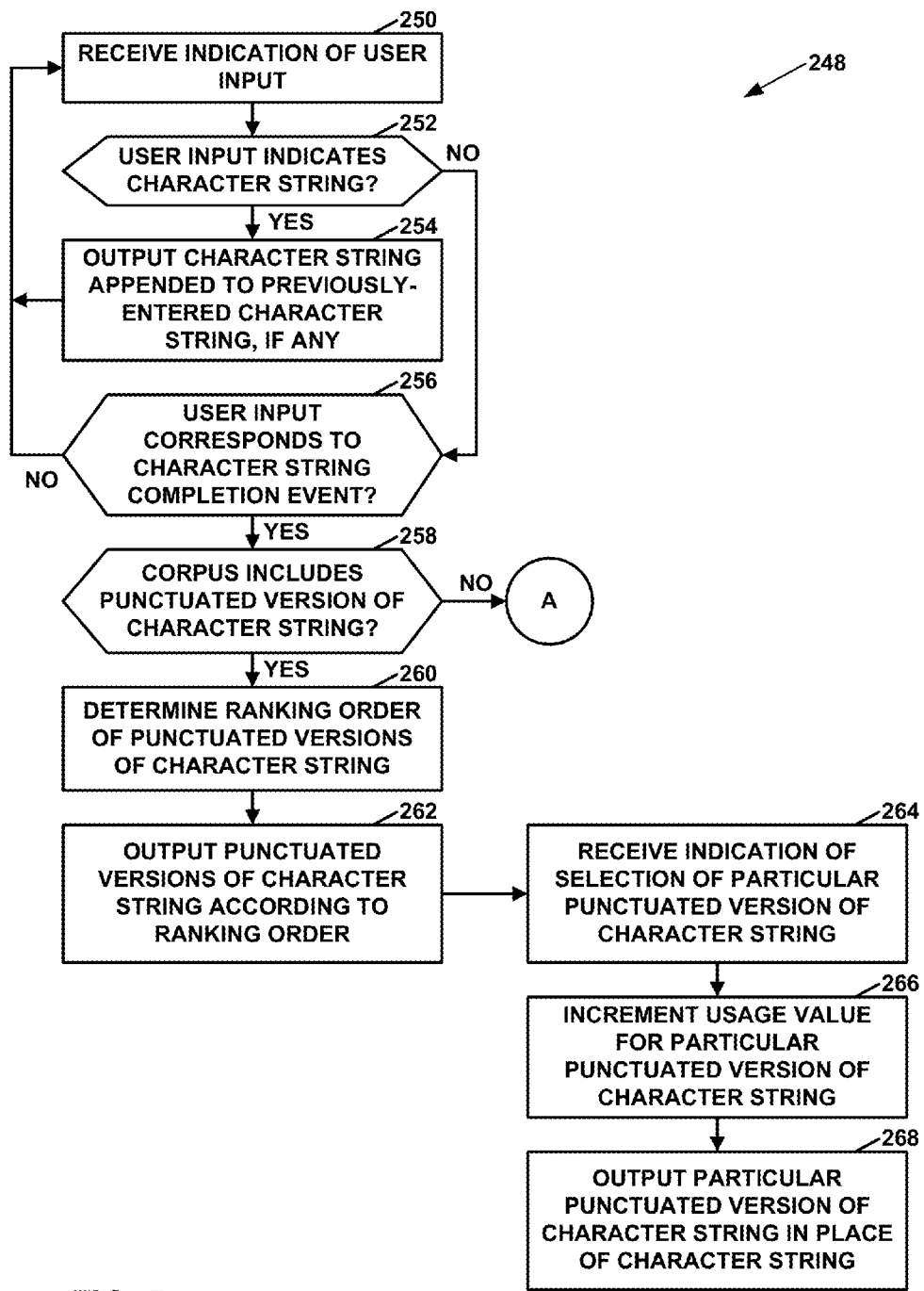
FIG. 5 is a flowchart illustrating an example operation of an Input Method Editor (IME) module, in accordance with one or more example techniques of this disclosure.

FIG. 5 is a flowchart illustrating an example operation 248 of IME module 6, in accordance with one or more example techniques of this disclosure. As illustrated in the example of FIG. 5, IME module 6 may receive one or more indications of user input (250). In some examples, IME module 6 receives an indication of user input from UI device 4. Furthermore, in some examples, IME module 6 may receive an indication of a sliding gesture. In other examples, IME module 6 may receive an indication of a tapping gesture that corresponds to a graphical key.

Responsive to receiving the indication of user input, IME module 6 may determine whether the user input corresponds to a string of one or more characters (i.e., a character string) (252). In response to determining that the user input corresponds to a character string ("YES" branch of 252), IME module 6 may output, for display, the character string appended to a previously-entered character string, if any (254). The resulting character string may be referred to herein as the current character string. Subsequently, IME module 6 may receive another indication of user input (250).

In response to determining that the user input does not correspond to a character string ("NO" branch of 252), IME module 6 may determine whether the user input corresponds to a character string completion event (256). In response to determining that the user input does not correspond to a character string completion event ("NO" of 256), IME module 6 may receive another indication of user input (250).

However, in response to determining that the user input corresponds to a character string completion event ("YES" of 256), IME module 6 may determine whether corpus 46 includes any punctuated versions of the current character string (258). In response determining that corpus 46 does not include any punctuated versions of the current character string ("NO" branch of 258), IME module 6 may perform the portion of operation 248 shown in FIG. 5 (denoted by "A").

On the other hand, in response to determining that corpus 46 includes one or more punctuated versions of the current character string ("YES" branch of 258), IME module 6 may determine a ranking order of the one or more punctuated versions of the current character string (260). In some examples, IME module 6 may determine the ranking order based on data regarding past usage by the user (e.g., usage values) of the punctuated versions of the current character string. Furthermore, IME module 6 may output, for display, the one or more punctuated versions of the character string ordered according to the ranking order of the one or more punctuated versions of the current character string (262).

Subsequently, IME module 6 may receive an indication of a selection of a particular punctuated version of the current character string (264). Responsive to receiving the indication of the selection of the particular punctuated version of the current character string, IME module 6 may increment a usage value in corpus 46 for the particular punctuated version of the current character string (266). Furthermore, responsive to receiving the indication of the selection of the particular punctuated version of the current character string, IME module 6 may output, for display, the particular punctuated version of the current character string in place of the current character string (268). In some examples, IME module 6 may output a particular punctuated version of the current character string in place of the current character string without first receiving an indication of a selection of the particular punctuated version of the current character string. Thus, in such examples, replacing the character string with a highest ranked punctuated character string may be a default action.

Figure 6:
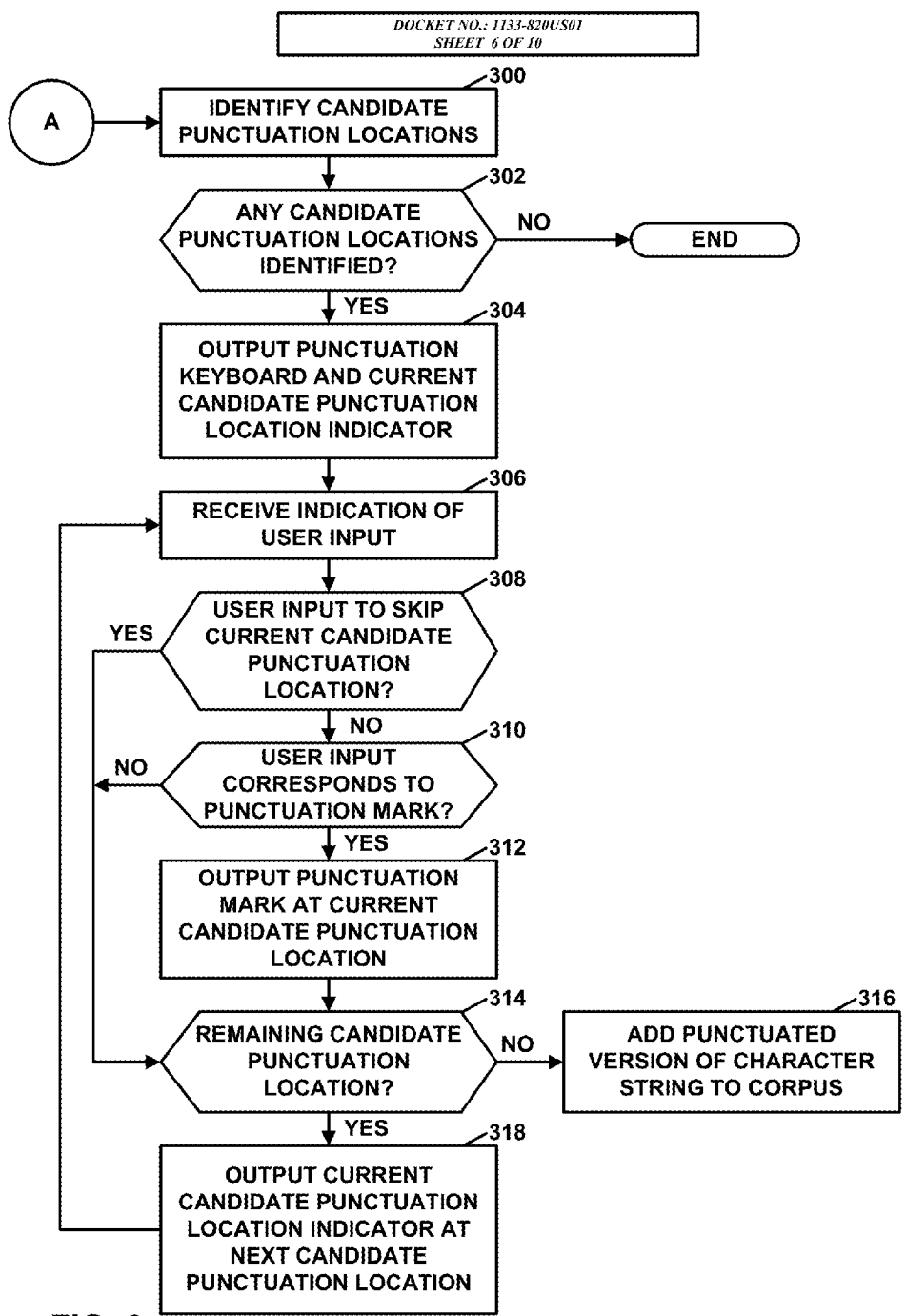
FIG. 6 is a flowchart illustrating an example portion of the operation of FIG. 5, in accordance with one or more techniques of this disclosure.

FIG. 6 is a flowchart illustrating an example portion of operation 248 of FIG. 5, in accordance with one or more techniques of this disclosure. As indicated above, IME module 6 may perform operation 248 in response to determining that corpus 46 does not include any punctuated versions of the current character string ("NO" branch of 258).

In the example of FIG. 6, IME module 6 may identify one or more candidate punctuation locations (300). Each of the candidate punctuation locations may be a location at which a punctuation mark is likely to occur. In some examples, IME module 6 may determine the candidate punctuation locations based at least in part on grammar rules. In other examples, IME module 6 may determine the candidate punctuation locations based at least in part on the user's usage of punctuation in sentences that are similar to the current character string.

Subsequently, IME module 6 may determine whether any candidate punctuation locations were identified (302). In response to determining that no candidate punctuation locations were identified ("NO" branch of 302), IME module 6 may end operation 248. On the other hand, in response to determining that one or more candidate punctuation locations were identified ("YES" branch of 302), IME module 6 may output, for display, a punctuation-specific keyboard and a current candidate punctuation location indicator (304). The punctuation-specific keyboard may include graphical keys that correspond to punctuation marks. In some examples the punctuation keyboard does not include graphical keys that correspond to letters. The current candidate punctuation location indicator may indicate a current candidate punctuation location among the one or more identified candidate punctuation locations.

Subsequently, IME module 6 may receive an indication of user input (306). IME module 6 may then determine whether the user input is to skip the current candidate punctuation location (308). In response to determining that the user input is not to skip the current candidate punctuation location ("NO" branch of 308), IME module 6 may determine whether the user input corresponds to a punctuation mark (310). In response to determining that the user input corresponds to a punctuation mark ("YES" branch of 310), IME module 6 may output, for display, the punctuation mark at the current candidate punctuation location (312).

If the user input is to skip the current candidate punctuation location ("YES" branch of 308), or if the user input does not correspond to a punctuation mark ("NO" branch of 310), or after outputting the punctuation mark at the current candidate punctuation location, IME module 6 may determine whether there is at least one remaining candidate punctuation location (314). In response to determining that there are no remaining candidate punctuation locations ("NO" branch of 314), IME module 6 may add the current, punctuated version of the character string to corpus 46 (316). Otherwise, in response to determining that there is at least one remaining candidate punctuation location ("YES" of 314), IME module 6 may output the current candidate punctuation location indicator at a next one of the candidate punctuation locations (318) and may receive another indication of user input (306).

In this way, IME module 6 may provide the user with an opportunity to insert a punctuation mark at each of the identified candidate punctuation locations using a graphical keyboard that is specifically designed for input of punctuation marks. For instance, if the inputted character string is not matched, at completion of a message that includes the inputted character string, the user is given a screen with only punctuation characters and is asked which punctuations go where in the inputted character string. That is, IME module 6 may receive, one or more indications of user input to input a character string. In response to determining that the character string does not match a non-punctuated version of any punctuated character string in the corpus (e.g., corpus 46), IME module 6 may output, for display, the character string and a keyboard that comprises a plurality of graphical keys corresponding to a plurality of punctuation marks. Furthermore, IME module 6 may receive an indication of a user selection of a particular graphical key among the plurality of graphical keys and output, for display, a modified version of the character string that includes a punctuation mark that corresponds to the particular graphical key.

Figure 7:
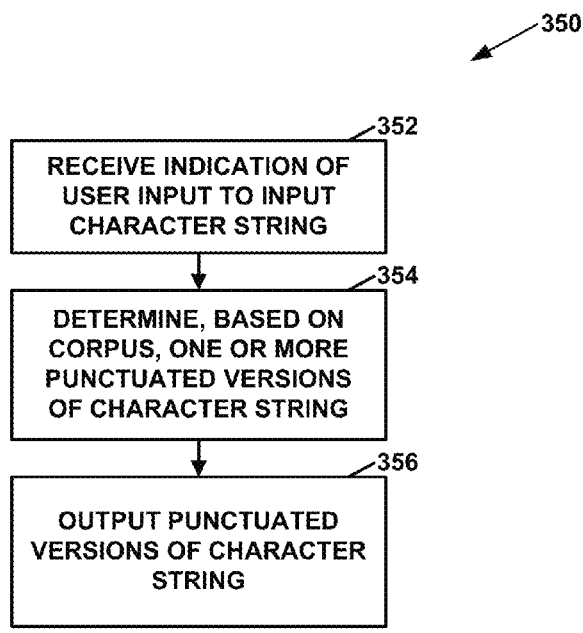
FIG. 7 is a flowchart illustrating an example operation of a computing device, in accordance with one or more techniques of this disclosure.

FIG. 7 is a flowchart illustrating an example operation 350 of computing device 2, in accordance with one or more techniques of this disclosure. In the example of FIG. 7, computing device 2 may receive one or more indications of user input to input a character string (352). In addition, computing device 2 may determine, based on a corpus (e.g., corpus 46) of punctuated character strings previously entered by a user of computing device 2, one or more punctuated versions of the character string (354). Each of the one or more punctuated versions of the character string may include one or more punctuation marks not present in the character string. Furthermore, computing device 2 may output, for display, the one or more punctuated versions of the character string (356).

Figure 8A:
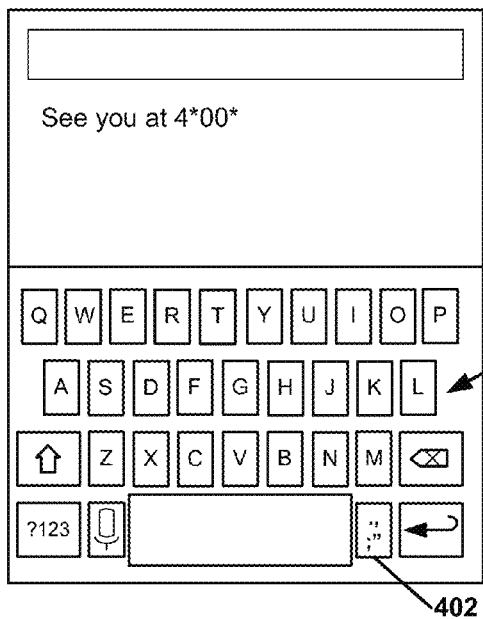
FIGS. 8A-8D are conceptual diagrams illustrating an example sequence of user interfaces output for display by a computing device, in accordance with one or more techniques of this disclosure.

FIGS. 8A-8D are conceptual diagrams illustrating an example sequence of user interfaces output for display by computing device 2, in accordance with one or more techniques of this disclosure. In accordance with such techniques, IME module 6 may output, for display, a first graphical keyboard. The first graphical keyboard may include keys for characters (e.g., letters) and a key for a generic punctuation mark. In the example of FIG. 8A, graphical keyboard 400 is a graphical keyboard that includes keys for characters and a key 402 for a generic punctuation mark. The generic punctuation mark may be a stand-in for any punctuation mark in a plurality of punctuation marks. Furthermore, IME module 6 may receive an indication of user input of a character string. Because the graphical keyboard includes a key for a generic punctuation mark, the character string may include one or more generic punctuation marks.

Figure 8B:
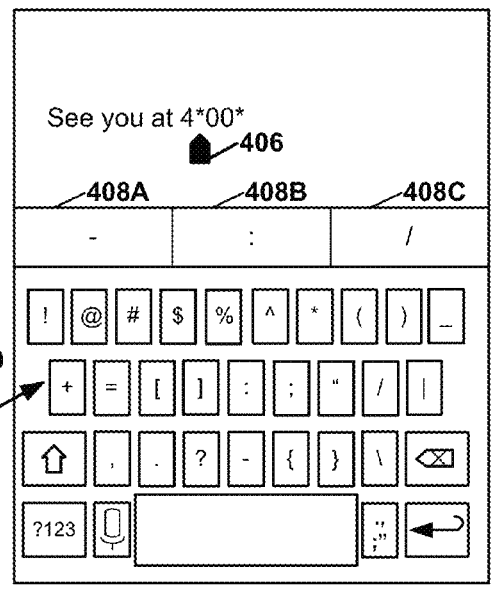
Figure 8C:
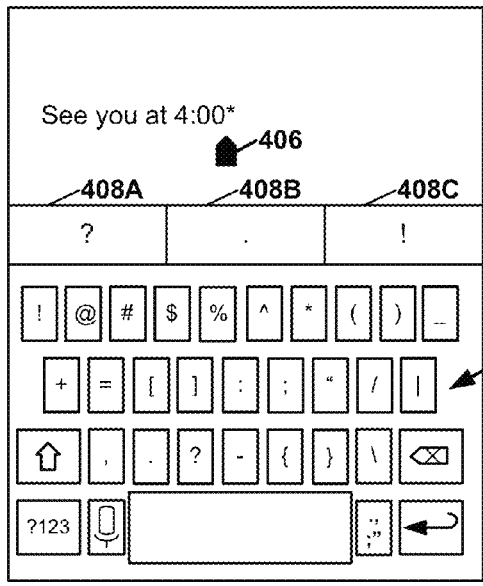
Figure 8D:
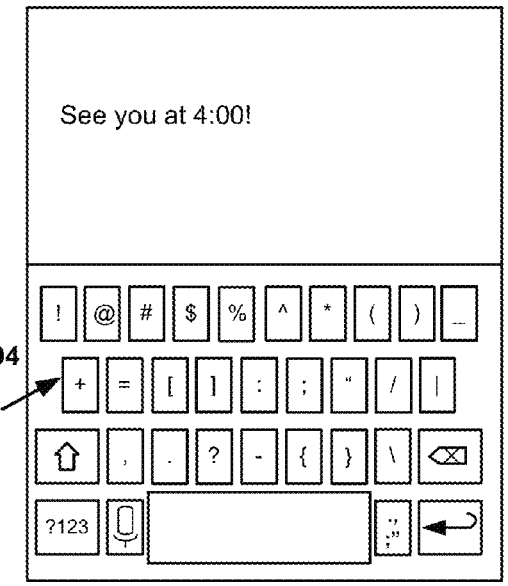

When a character string completion event occurs (e.g., IME module 6 receives an indication of a user input to send the character string in a text message), IME module 6 may output a second graphical keyboard for display. The second graphical keyboard may include keys associated with different non-generic punctuation marks. For example, the second graphical keyboard may include keys associated with punctuation marks such as ".", ",", "!", etc. In the example of FIGS. 8A-8D, IME module 6 may output graphical keyboard 404 in response to receiving a character string completion event. As shown in FIGS. 8B-8D, graphical keyboard 404 includes keys associated with different non-generic punctuation marks.

For each generic punctuation mark in the character string, IME module 6 provides an opportunity to the user to use the second graphical keyboard to replace the generic punctuation mark with a non-generic punctuation mark. In this way, IME module 6 may, in response to an indication of user input to select graphical keys of the second graphical keyboard, replace each of the generic punctuation marks in the character string with a non-generic punctuation mark. A final version of the character string may include the selected non-generic punctuation marks in place of the generic punctuation marks. Such techniques may obviate the need for the user to explicitly instruct computing device 2 to switch graphical keyboards (or perform some other special action) in order to input the desired punctuation marks.

As shown in the example of FIG. 8A, IME module 6 may receive a user input of the character string "See you at 4*00*", where * denotes a generic punctuation mark. In this example, IME module 6 may prompt the user to indicate a non-generic punctuation mark for the first generic punctuation mark and to indicate a non-generic punctuation mark for the second generic punctuation mark. For instance, in the example of FIG. 8B, IME module 6 may output, for display, a current generic punctuation mark indicator 406 at a location associated with the first generic punctuation mark to prompt the user to indicate a non-generic punctuation mark for the first generic punctuation mark. In other words, IME module 6 may output, for display, the current generic punctuation mark indicator 406 at a location such that the current generic punctuation mark indicator 406 indicates the first generic punctuation mark. As shown in the example of FIG. 8C, IME module 6 may receive an indication of a user input to select the ":" punctuation mark for the first generic punctuation mark. Furthermore, as shown in the example of FIG. 8C, IME module 6 may output current generic punctuation mark indicator 406 at a position associated with the second generic punctuation mark in order to prompt the user to provide a non-generic punctuation mark for the second generic punctuation mark. In other words, IME module 6 may output, for display, the current generic punctuation mark indicator 406 at a location such that the current generic punctuation mark indicator 406 indicates the second generic punctuation mark. As shown in the example of FIG. 8D, IME module 6 may receive an indication of a user input to select the "!" punctuation mark for the second generic punctuation mark. Thus, as shown in the example of FIG. 8D, the final version of the character string may be "See you at 4:00!".

In some examples, IME module 6 may determine a ranked set of suggested punctuation marks for each of the generic punctuation marks in the character string. In some examples, IME module 6 may determine the ranked set of suggested punctuation marks for a particular generic punctuation mark such that the particular generic punctuation mark is more likely to be replaced by a higher ranked suggested punctuation mark than a lower ranked suggested punctuation mark.

In some examples, IME module 6 may determine a rank of a suggested punctuation mark based at least in part on data regarding the number of times that the user of computing device 2 has inputted (or otherwise selected) the punctuation mark in punctuated versions of the character string. For example, IME module 6 may rank a suggested punctuation mark for a particular generic punctuation mark in a character string by identifying, in corpus 46, punctuated versions of the character string. In this example, IME module 6 may then determine, based on the number of times that a user of computing device 2 has selected a punctuated version of the character string that includes the suggested punctuation mark at a location that corresponds to the location of the particular generic punctuation mark, a ranking order of the suggested punctuation mark.

As illustrated in the examples of FIGS. 8B and 8C, IME module 6 may output, for display, a set of suggestion elements 408A-408C (collectively, "suggestion elements 408") after IME module 6 determines that a character string completion event has occurred. When a particular generic punctuation mark is the current generic punctuation mark, suggestion elements 408 may include a set of suggested punctuation marks for the particular generic punctuation marks. In the examples of FIGS. 8B and 8C, the suggested punctuation marks displayed in suggestion elements 408 are the three highest ranked suggested punctuation marks for the respective generic punctuation marks. For instance, in FIG. 8B, the punctuation mark ":" may be ranked highest, followed by the punctuation mark "-", and then the punctuation mark "/". Similarly, in FIG. 8C, the punctuation mark "." may be ranked highest, followed by the punctuation mark "?" and then the punctuation mark "!". The highest-ranked punctuation mark may be displayed in the middle suggestion element because the middle suggestion element may be the easiest for a user to see and select. In other examples, computing device 2 may output, for display, other numbers of suggested punctuation marks.

In response to receiving an indication of a user input to select one of suggestion elements 408, IME module 6 may output the punctuation mark shown in the suggestion element in place of the current generic punctuation mark. Because finding the desired punctuation mark in punctuation-specific keyboard 404 may be relatively time-consuming relative to selecting a punctuation mark from among suggestion elements 408, suggestion elements 408 may increase the speed with the user is able to replace generic punctuation marks with specific punctuation marks.

In this way, IME module 6 may allow users to specify where punctuation goes without specifying what the punctuation is. Then, IME module 6 may index a version with all punctuation characters replaced by a generic punctuation character and the version with correct punctuation. When a user has finished entering a string, IME module 6 may compare the string with the index with the generic punctuation version and either replaces the string or offers options. In this example, IME module 6 may jump between possible punctuation options and prompts the user to enter the correct punctuation characters.

Figure 9:
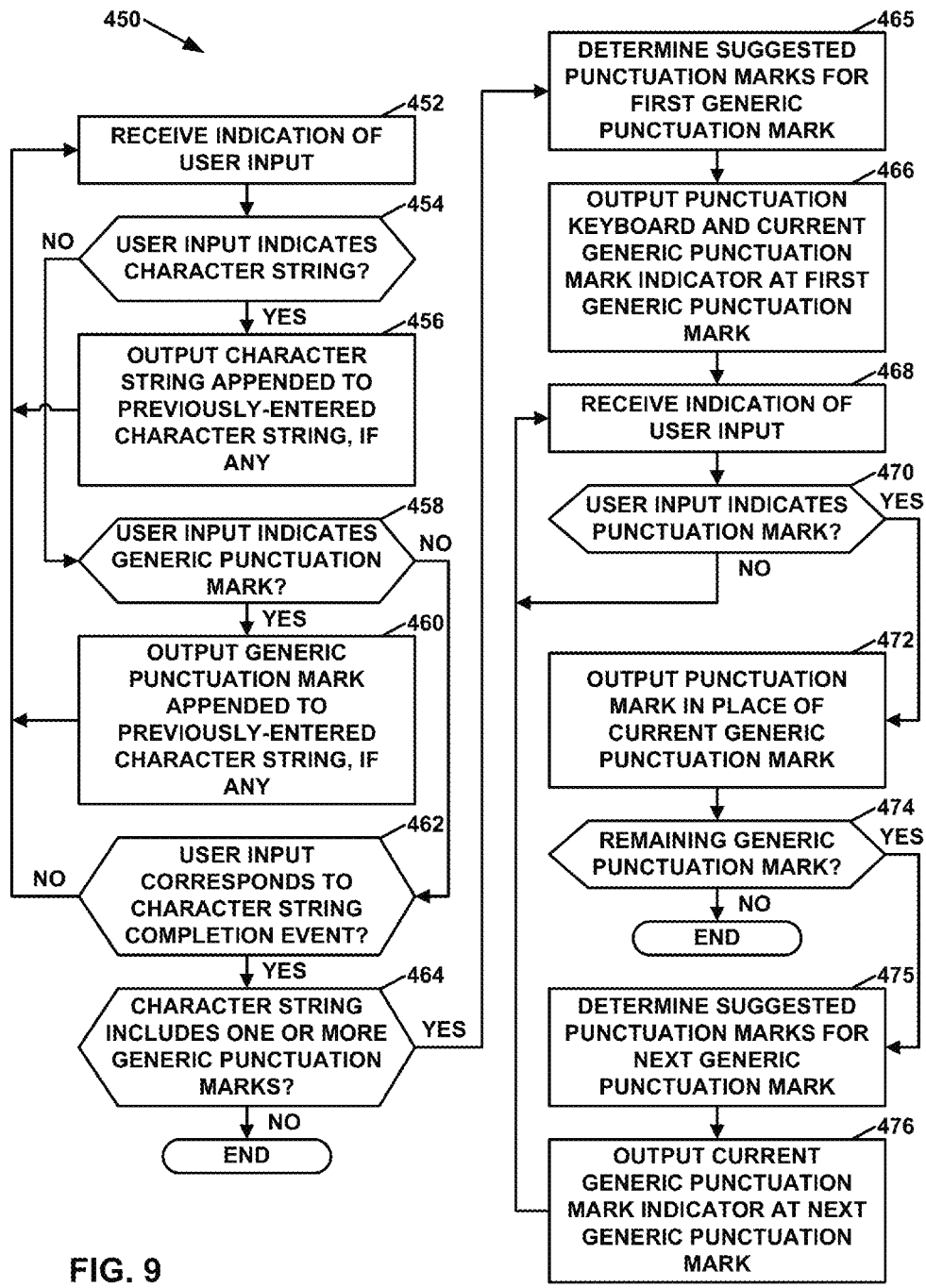
FIG. 9 is a flowchart illustrating an example operation of a computing device, in accordance with one or more example techniques of this disclosure.

FIG. 9 is a flowchart illustrating an example operation 450 of computing device 2, in accordance with one or more example techniques of this disclosure. Operation 450 may correspond to the example technique described above with regard to FIGS. 8A-8D.

In the example of FIG. 9, IME module 6 may receive an indication of user input (452). In some examples, IME module 6 receives an indication of user input from UI device 4. Furthermore, in some examples, IME module 6 may receive an indication of a sliding gesture. In other examples, IME module 6 may receive an indication of a tapping gesture that corresponds to a graphical key.

In addition, IME module 6 may determine whether the user input corresponds to a character string (i.e., one or more characters) (454). In response to determining that the user input corresponds to a character string ("YES" branch of 454), IME module 6 may output, for display, the character string appended to a previously-entered character string, if any (456). For example, if the previously-entered character string is "Se" and the user input indicates the character string "e", IME module 6 may output, for display, the character string "See". The previously-entered character string may indicate characters entered subsequent to display of a text entry area or subsequent to a previous character string completion event. Subsequently, IME module 6 may receive another indication of user input (452).

On the other hand, in response to determining that the user input does not indicate a character string ("NO" branch of 454), IME module 6 may determine whether the user input corresponds to a generic punctuation mark (458). For example, IME module 6 may determine whether the user input corresponds to a tapping gesture at graphical key 402 (FIG. 8A). In response to determining that the user input corresponds to a generic punctuation mark ("YES" of 458), IME module 6 may output, for display, the generic punctuation mark appended to the previously-entered character string, if any (460). For example, if the previously-entered character string is "excellent" and * indicates the generic punctuation mark, IME module 6 may output, for display, the character string "excellent*". Subsequently, IME module 6 may receive another indication of user input (452).

In response to determining that the user input does not correspond to the generic punctuation mark ("NO" branch of 458), IME module 6 may determine whether the user input corresponds to a character string completion event (462). In the example of FIG. 9, in response to determining that the user input does not correspond to a character string completion event ("NO" branch of 462), IME module 6 may receive another indication of user input (452).

However, in response to determining that the user input corresponds to a character string completion event ("YES" branch of 462), IME module 6 may determine whether the character string includes one or more generic punctuation marks (464). In response to determining that the character string does not include any generic punctuation marks ("NO" branch of 464), IME module 6 may end operation 450.

On the other hand, in response to determining that the character string includes one or more generic punctuation marks ("YES" branch of 464), IME module 6 may determine suggested punctuation marks for the first generic punctuation mark in the character string (465). In some examples, IME module 6 may determine the suggested punctuation marks for the first generic punctuation marks based on grammar rules and/or historical data regarding the user's use of punctuation marks in similar character strings. In addition, IME module 6 may output, for display, a punctuation-specific keyboard (e.g., keyboard 404 in FIGS. 8B-8D), a current generic punctuation mark indicator (e.g., current generic punctuation mark indicator 806 in FIGS. 8B and 8C) such that the current generic punctuation mark indicator indicates that the first generic punctuation mark in the character string is the current generic punctuation mark, and suggestion elements containing one or more of the suggested punctuation marks for the current generic punctuation mark (466).

Furthermore, IME module 6 may receive an additional indication of user input (468). Responsive to receiving the additional indication of user input, IME module 6 may determine whether the additional user input indicates a punctuation mark (470). In response to determining that the additional user input does not indicate a punctuation mark ("NO" branch of 470), IME module 6 may ignore or otherwise process the additional user input and again receive an indication of user input (468). On the other hand, in response to determining that the additional user input indicates a punctuation mark ("YES" branch of 470), IME module 6 may output the punctuation mark for display in place of the current generic punctuation mark (472). In some examples, IME module 6 may determine that the additional user input corresponds to a punctuation mark when the user input indicates a tapping gesture on a particular graphical key of the punctuation-specific graphical keyboard or one of the suggestion elements. IME module 6 may then determine whether there are any remaining generic punctuation marks in the character string (474). In response to determining that there are no remaining generic punctuation marks in the character string ("NO" branch of 474), IME module 6 may end operation 450. However, in response to determining that there are one or more remaining generic punctuation marks in the character string ("YES" branch of 476), IME module 6 may determine suggested punctuation marks for the next generic punctuation mark in the character string (475). In addition, IME module 6 may output, for display, the current generic punctuation mark indicator such that the current generic punctuation mark indicator indicates that the next generic punctuation mark in the character string is the current generic punctuation mark and such that the suggestion elements contain one or more of the suggested punctuation marks for the next generic punctuation mark (476). IME module 6 may then receive an indication of additional user input (468). In this way, IME module 6 may enable a user of computing device 2 to use a punctuation-specific graphical keyboard to replace each of the generic punctuation marks with specific punctuation marks.

Figure 10:
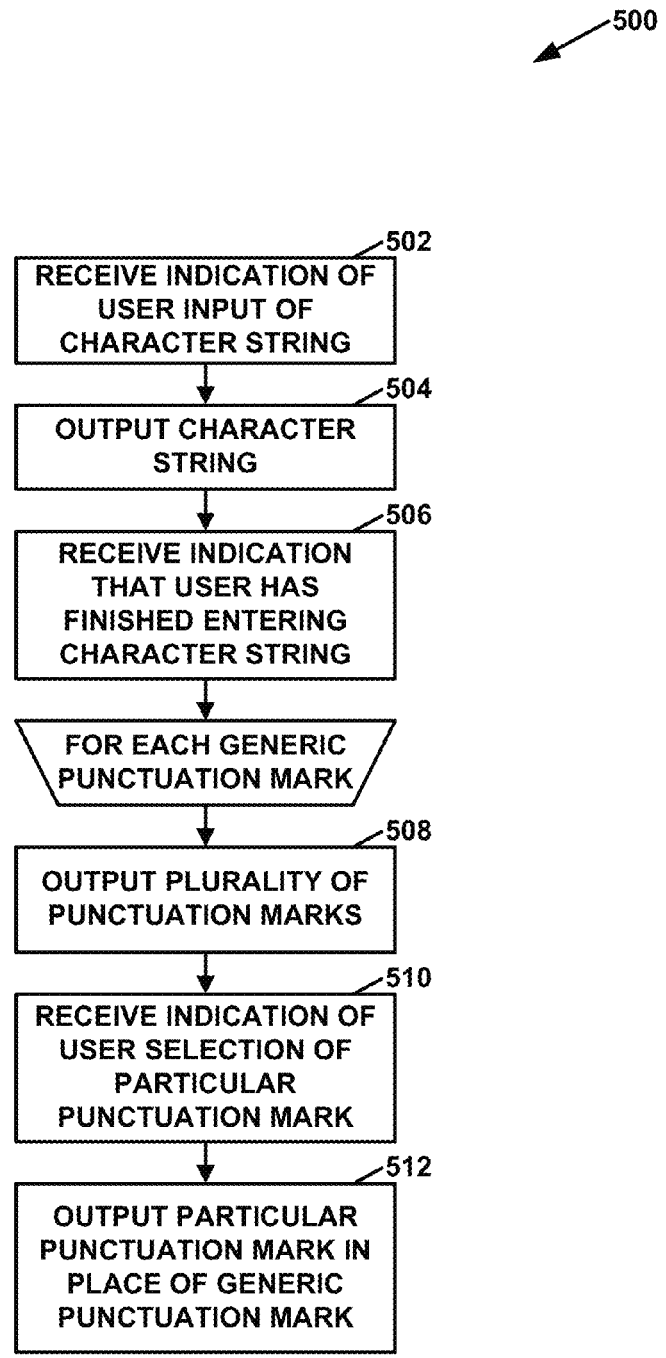
FIG. 10 is a flowchart illustrating an example operation of a computing device, in accordance with one or more techniques of this disclosure.

FIG. 10 is a flowchart illustrating an example operation of computing device 2, in accordance with one or more techniques of this disclosure. Operation 450 may correspond to the example techniques described above with regard to FIGS. 8A-8D and FIG. 9. In the example of FIG. 10, computing device 2 may receive one or more indications of user input of a character string that comprises one or more non-punctuation characters and a plurality of generic punctuation mark characters (452). In addition, computing device 2 may output the character string for display (504).

Responsive to receiving an indication that a user has finished entering the character string, computing device 2 may perform the following actions for each respective generic punctuation mark among the plurality of generic punctuation marks. Computing device 2 may output a plurality of punctuation marks (508). For instance, computing device 2 may output a punctuation-specific graphical keyboard for display. Furthermore, computing device 2 may receive an indication of a user selection of a particular punctuation mark from among the plurality of punctuation marks (510). Computing device 2 may then output, for display, the particular punctuation mark in place of the respective generic punctuation mark (512).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
    receiving, by a computing device, one or more indications of user input to enter a character string;
    responsive to determining that the character string does not match a non-punctuated version of any punctuated character string in a corpus that includes punctuated character strings previously entered by a user of the computing device each of the punctuated character strings in the corpus including one or more punctuation marks:
        outputting, by the computing device, for display, the character string and a keyboard that comprises a plurality of graphical keys corresponding to a plurality of punctuation marks;
        receiving, by the computing device, an indication of a user selection of a particular graphical key among the plurality of graphical keys; and
        outputting, by the computing device and for display, a modified version of the character string that includes a punctuation mark that corresponds to the particular graphical key.

2. The method of claim 1, wherein each of the punctuated character strings in the corpus is a multi-word sentence.

3. The method of claim 1, wherein the character string is a first character string, and the method further comprises:
    receiving, by the computing device, one or more indications of user input to enter a second character string;
    determining, by the computing device, based on the corpus, one or more punctuated versions of the second character string, each of the one or more punctuated versions of the second character string including one or more punctuation marks not present in the second character string; and
    outputting, by the computing device and for display, the one or more punctuated versions of the second character string.

4. The method of claim 3, further comprising:
    after outputting the one or more punctuated versions of the second character string, receiving, by the computing device, an indication of user input to select a particular character string from among the one or more punctuated versions of the second character string; and
    outputting, by the computing device and for display, the particular character string in place of the second character string.

5. The method of claim 3, wherein the second character string matches non-punctuated versions of the punctuated character strings previously-entered by the user.

6. The method of claim 3, wherein:
the method further comprises determining, by the computing device, based on data regarding past usage by the user of the one or more punctuated versions of the second character string, a ranking order of the one or more punctuated versions of the second character string; and
outputting the one or more punctuated versions of the second character string comprises outputting, by the computing device, for display, the one or more punctuated versions of the second character string ordered according to the ranking order of the one or more punctuated versions of the second character string.

7. The method of claim 6, wherein the data regarding past usage by the user of the one or more punctuated versions of the second character string comprise data indicating numbers of times that the computing device has received indications of user input of the one or more punctuated versions of the second character string.

8. The method of claim 3, wherein outputting the one or more punctuated versions of the second character string comprises, in response to receiving an indication that the user has finished inputting the second character string, outputting, by the computing device, for display, the one or more punctuated versions of the second character string.

9. The method of claim 8, wherein the indication that the user has finished inputting the second character string comprises an indication of a user input to send the second character string to another computing device.

10. The method of claim 3, wherein at least one of the one or more punctuated versions of the second character string includes a capitalized letter in place of a non-capitalized letter in the second character string.

11. The method of claim 1, wherein:
the method further comprises in response to determining that the corpus does not include any punctuated versions of the character string:
identifying, by the computing device, one or more candidate punctuation locations, each of the one or more candidate punctuation locations being a location at which a punctuation mark is likely to occur;
outputting, by the computing device, a candidate punctuation location indicator indicating a current candidate punctuation location among the one or more identified candidate punctuation locations;
outputting the modified version of the character string comprises outputting, by the computing device and for display the modified version of the character string such that the modified version of the character string includes, at the current candidate punctuation location, the punctuation mark that corresponds to the particular graphical key.

12. The method of claim 11, further comprising responsive to determining that there is at least one remaining candidate punctuation location in the one or more identified candidate punctuation locations, outputting, by the computing device and for display, the current candidate punctuation location indicator at a next one of the identified candidate punctuation locations.

13. A computing device comprising one or more processors configured to:
receive one or more indications of user input to input a character string;
responsive to determining that the character string does not match a non-punctuated version of any punctuated character string in a corpus that includes punctuated character strings previously entered by a user of the computing device, each of the punctuated character strings in the corpus including one or more punctuation marks:
output, for display, the character string and a keyboard that comprises a plurality of graphical keys corresponding to a plurality of punctuation marks;
receive an indication of a user selection of a particular graphical key among the plurality of graphical keys; and
output, for display, a modified version of the character string that includes a punctuation mark that corresponds to the particular graphical key.

14. The computing device of claim 13, wherein the character string is a first character string and the one or more processors are further configured to:
receive one or more indications of user input to input a second character string;
determine, based on the corpus, one or more punctuated versions of the second character string, each of the one or more punctuated versions of the second character string including one or more punctuation marks not present in the second character string; and
output, for display, the one or more punctuated versions of the second character string.

15. The computing device of claim 14, wherein the one or more processors are configured such that, in response to receiving an indication of a user input to select a particular character string from among the one or more punctuated versions of the second character string, the one or more processors output, for display, the particular character string in place of the second character string.

16. The computing device of claim 14, wherein the second character string matches non-punctuated versions of the punctuated character strings previously-entered by the user.

17. The computing device of claim 14, wherein the one or more processors are configured to:
determine, based on data regarding past usage by the user of the one or more punctuated versions of the second character string, a ranking order of the one or more punctuated versions of the second character string; and
output, for display, the one or more punctuated versions of the second character string ordered according to the ranking order of the one or more punctuated versions of the second character string.

18. The computing device of claim 17, wherein the data regarding past usage by the user of the one or more punctuated versions of the second character string comprise data indicating numbers of times that the computing device has received indications of user input of the one or more punctuated versions of the second character string.

19. A non-transitory computer-readable data storage medium having instructions stored thereon that, when executed, cause one or more processors of a computing device to:
receive one or more indications of user input to enter a character string;
responsive to determining that the character string does not match a non-punctuated version of any punctuated character string in a corpus that includes punctuated character strings previously entered by a user of the computing device, each of the punctuated character strings in the corpus including one or more punctuation marks:
output, for display, the character string and a keyboard that comprises a plurality of graphical keys corresponding to a plurality of punctuation marks;
receive an indication of a user selection of a particular graphical key among the plurality of graphical keys; and output, for display, a modified version of the character string that includes a punctuation mark that corresponds to the particular graphical key.

20. The non-transitory computer-readable data storage medium of claim 19, wherein the character string is a first character string and the instructions, when executed, further cause the computing device to:
   determine, in response to receiving one or more indications of user input to enter a second character string, based on the corpus, one or more punctuated versions of the second character string, each of the one or more punctuated versions of the second character string including one or more punctuation marks not present in the second character string;
   output, for display, the one or more punctuated versions of the second character string; and
   responsive to receiving an indication of user selection of a particular character string from among the one or more punctuated versions of the second character string, output, for display, the particular character string in place of the second character string.

21. The non-transitory computer-readable data storage medium of claim 20, wherein the instructions, when executed, further cause the one or more processors to:
   determine, based on data regarding past usage by the user of the one or more punctuated versions of the second character string, a ranking order of the one or more punctuated versions of the second character string; and
   output, for display, the one or more punctuated versions of the second character string ordered according to the ranking order of the one or more punctuated versions of the second character string.

* * * * *